US004001709B2

United States Statutory Invention Registration [19]

[11] Reg. Number: H1709

Felix

[45] Published: Feb. 3, 1998

[54] THERMAL DESTRUCTION OF HALOCARBONS

[75] Inventor: Vinci Martinez Felix, Kennett Square, Pa.

[73] Assignee: E. I. du Pont de Nemours and Company, Wilmington, Del.

[21] Appl. No.: 635,082

[22] Filed: Apr. 19, 1996

[51] Int. Cl.[6] ..... C01B 7/01

[52] U.S. Cl. ..... 423/481

[58] Field of Search ..... 423/481, 483, 423/240 R

[56] References Cited

U.S. PATENT DOCUMENTS

| | | | |
|---|---|---|---|
| 5,372,661 | 12/1994 | Felix et al. | 148/423 |
| 5,510,093 | 4/1996 | Bartz et al. | 423/240 R |
| 5,565,393 | 10/1996 | Felix et al. | 502/20 |

OTHER PUBLICATIONS

T–Thermal, Waste Oxidization Systems Combustion Technology for the Management of Chemical Waste, Undated, T–Thermal Inc. Conshohoken PA.

Hydrofluoric Acid, Anhydrous Technical, DuPont Chemical and Pigments, Wilmington DE, Jun. 1990.

Kiang et al, "Hazardous Waste Processing Technology" (1982, no month) pp. 210–216.

*Primary Examiner*—Charles T. Jordan
*Assistant Examiner*—Meena Chelliah
*Attorney, Agent, or Firm*—Edwin Tocker

[57] ABSTRACT

A downcomer used to direct hot flue gases from oxidative combusion of halocarbons into an aqueous medium in a quench tank has improved corrosion resistance when made of rhenuim, molybdenum, or an alloy containing at least 50 wt % molybdenum and having a corrosion rate not exceeding 0.254 mm/yr.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL DESTRUCTION OF HALOCARBONS

FIELD OF THE INVENTION

The present invention relates to the field of thermal destruction by oxidative combustion of halocarbons containing fluorine, bromine or iodine and optionally chlorine to produce the corresponding hydrogen halides, and in particular to an apparatus and method for quenching the hydrogen halide-containing flue gases with water to produce higher strength hydrogen halide solutions.

BACKGROUND OF THE INVENTION

The commercial production of halocarbons frequently results in the unwanted production of various halocarbon byproducts which are not readily biodegradable and hence difficult to dispose of without harm to the environment. By halocarbon we mean any organic compound containing fluorine, chlorine, bromine or iodine and optionally other elements. Unwanted halocarbon byproducts are frequently disposed of in a pyrolysis or combustion unit, whereby the byproducts are heated to very high temperatures in the presence of an excess of air to be burned and converted to carbon dioxide and hydrogen halides. The required high temperatures are usually obtained by direct combustion of an auxiliary fuel such as natural gas or oil, since the organic halocarbon byproducts being destroyed frequently have a low or negative net heating value.

The hydrogen halides so generated are typically removed by dissolving in water added to the flue gases, creating an acid solution. The flue gases may be cooled by indirect heat exchange before or during the water addition. Because of the corrosivity of hydrogen halide gases at high temperatures, particularly in the presence of water, this cooling step is frequently carried out in graphite equipment. Such graphite heat exchangers are costly because of the high cost of fabrication and the low amount of heat exchange surface available in such inefficient designs relative to unit size. In addition, the graphite units are easily breakable due to thermal or mechanical shock.

In an alternative approach which avoids the need for indirect cooling and a large and costly heat exchange surface, sufficient water may be added directly to the flue gases to simultaneously cool the fine gases and create the acid solution, a process called quenching. The temperature of the acid solution and its acid concentration are thereby largely determined by the amount of water added.

The quenching apparatus is typically made of metal alloys, because non-metallic materials such as ceramics or graphite are too brittle to withstand the vibration due to the surging and turbulence encountered during the direct quenching of high velocity flue gases in water.

However, higher strength (and therefore higher temperature) aqueous hydrogen halide acid solutions, particularly solutions containing hydrogen fluoride (i.e. hydrofluoric acid), are corrosive to metals, especially in the presence of oxygen. Even such well-known corrosion resistant nickel/molybdenum alloys such as Hastelloy® B-2 have a limited life in such severe service. Hastelloy®B-2, an alloy made by Haynes International, Inc., contains about 26 to 30% molybdenum, 2% iron, 1% chromium, 1% cobalt and 1% manganese, with the balance essentially nickel. All percents disclosed herein are by weight and based on the total weight of the composition unless otherwise indicated.

To overcome the corrosion problem, sufficient water is typically added to produce a weaker, cooler but less corrosive acid. This is particularly the case with acids containing fluoride or fluoride-chloride mixtures, which tend to be much more corrosive than acids containing only chloride. In practice it has been found necessary to reduce the acid concentration of hydrogen fluoride or hydrogen fluoride/chloride mixtures generally to 5% by weight or less to avoid corrosion, even when using Hastelloy® B-2. The acid so produced is generally so weak as to be unsaleable. If this is the case, the resulting acid must be neutralized with an alkaline material before being discharged as a waste product, adding to costs. Even for an acid which must be neutralized, it is advantageous for the acid to be at as high a strength as possible, so as to reduce the size and cost of the treatment plant.

The procedures for handling neutralized hydrogen halide wastes may vary with the particular halide. Hydrogen fluoride acid wastes are typically neutralized with lime, creating solid calcium fluoride for disposal or storage. Hydrogen bromide and iodide wastes may be neutralized with lime or caustic soda, but resulting products may require careful handling to avoid environmental problems. However, wastes containing only hydrogen chloride can be neutralized with caustic soda to produce a more easily disposable sodium chloride. Hydrogen halide solutions composed of hydrogen fluorides, bromides or iodides also have a much higher potential sales value than wastes composed of hydrogen chloride, so that there is a particularly great economic and environmental value in developing a quenching system for halocarbon flue gases containing fluorine, bromine or iodine which permits production of high strength hydrogen halide acid solutions suitable for sale or reuse.

T-Thermal, Inc. has published an advertising pamphlet (date of publication unknown) entitled "Waste Oxidation Systems" describing their combustion systems used worldwide for thermal oxidation of halocarbons including fluorocarbons. Their system employs a Vortex burner with separate inlets for fuel, air and combustible or non-combustible gas or liquid wastes. The firebrick-lined combustion chamber exhausts downwardly via a conical transition piece to a smaller diameter downflow cylindrical pipe or downcomer made of special construction materials and equipped at its top with a weir to maintain an aqueous film flow down the interior wall of the downcomer. The downcomer enters down into a quench tank filled with water and extends to a short distance from the bottom of the quench tank. In the illustrated design, a cylindrical pipe of larger diameter than the downcomer surrounds it and forms an annular space around the downcomer open at top and bottom, so that the exhaust gases leaving the downcomer can rise through the annulus to the surface of the liquid in the quench tank, aiding circulation. The exiting liquid and gases from the quench tank leave by separate outlets for further processing as required. Other similar combustion/sparging systems are described on pages 210–216 of Y-K Kiang and A. A. Metry, "Hazardous Waste Processing Technology", published by Ann Arbor Science (1982). For example, gas-liquid contact in the quench tank may be enhanced by a number of aqueous sprays in the quench tank, in the annular contacting zone around the downcomer described above.

The material of construction for the downcomer is critical, because of the highly corrosive combination of halogen acids, high temperature and oxidizing conditions caused by entrained air. The Kiang and Metry publication above states (page 212) that this system is not suitable for high concentrations of HCl, with less than 1% HCl solution being the maximum concentration the alloy downcomer and weir can handle. T-Thermal, Inc. has recommended Hastelloy® B-2 for its downcomer material of construction for handling maximum hydrogen halide acid concentrations, i.e. up to about 3 to 5% by weight.

There is a need for a process and apparatus whereby halocarbons containing fluorine, bromine or iodine and optionally chlorine can be oxidatively incinerated and quenched by direct contact with water to form an exit concentration of halogen acids above 10% by weight in the aqueous quench medium without the need for indirect cooling of the flue gases or the high maintenance costs caused by excessive corrosion or breakage of the downflow cylinder.

SUMMARY OF THE INVENTION

The present invention satisfies this need, i.e. relates to a process and apparatus for the oxidative combustion of halocarbons containing fluorine, bromine and/or iodine and optionally chlorine to produce aqueous halogen acids of a concentration greater than 10% by weight wherein the hot flue gases are quenched with water using a downflow cylinder made of rhenium, molybdenum, or molybdenum alloys with a molybdenum content above 50% by weight. The cooled gases and aqueous acid are then sent to other purification or treating units as required for recovery.

Thus the present invention in one embodiment can be defined as an apparatus for converting gaseous hydrogen halides contained in hot flue gas to an aqueous solution of said hydrogen halides, comprising:

(a) downflow cylinder means having an upper inlet for receiving said flue gas and a lower outlet, (b) means for flowing an aqueous medium along the interior surface of said cylinder means, said interior surface of said downflow cylinder means comprising rhenium, molybdenum, or a metal of at least 50% by weight of molybdenum and having a corrosion rate not exceeding 0.254 mm/year and, (c) means for quenching and containing an aqueous medium positioned in communication with said outlet for receiving said flue gas after passage through said downflow cylinder means and thereby cooling said flue gas and forming said aqueous solution of the said hydrogen halide therein.

The present invention can also be defined as a process comprising:

(a) oxidatively combusting a halocarbon in a combustion zone to form a flue gas having a temperature of at least 1000° C., the combustion of said halocarbon converting said halocarbon to gaseous hydrogen halides present in said flue gas, (b) passing said flue gas through a downflow cylinder communicating between said combustion zone and a pool of aqueous medium while cooling the interior surface of said cylinder with aqueous medium, said interior surface comprising rhenium, molybedenum, or a metal of at least 50% by weight molybdenum and having a corrosion rate not exceeding 0.254 mm/year, and (c) collecting an aqueous solution of said gaseous hydrogen halide in said pool of aqueous medium, the concentration of said hydrogen halide in said aqueous solution being at least 10% by wt.

DETAILED DESCRIPTION OF THE INVENTION

Figure 1:
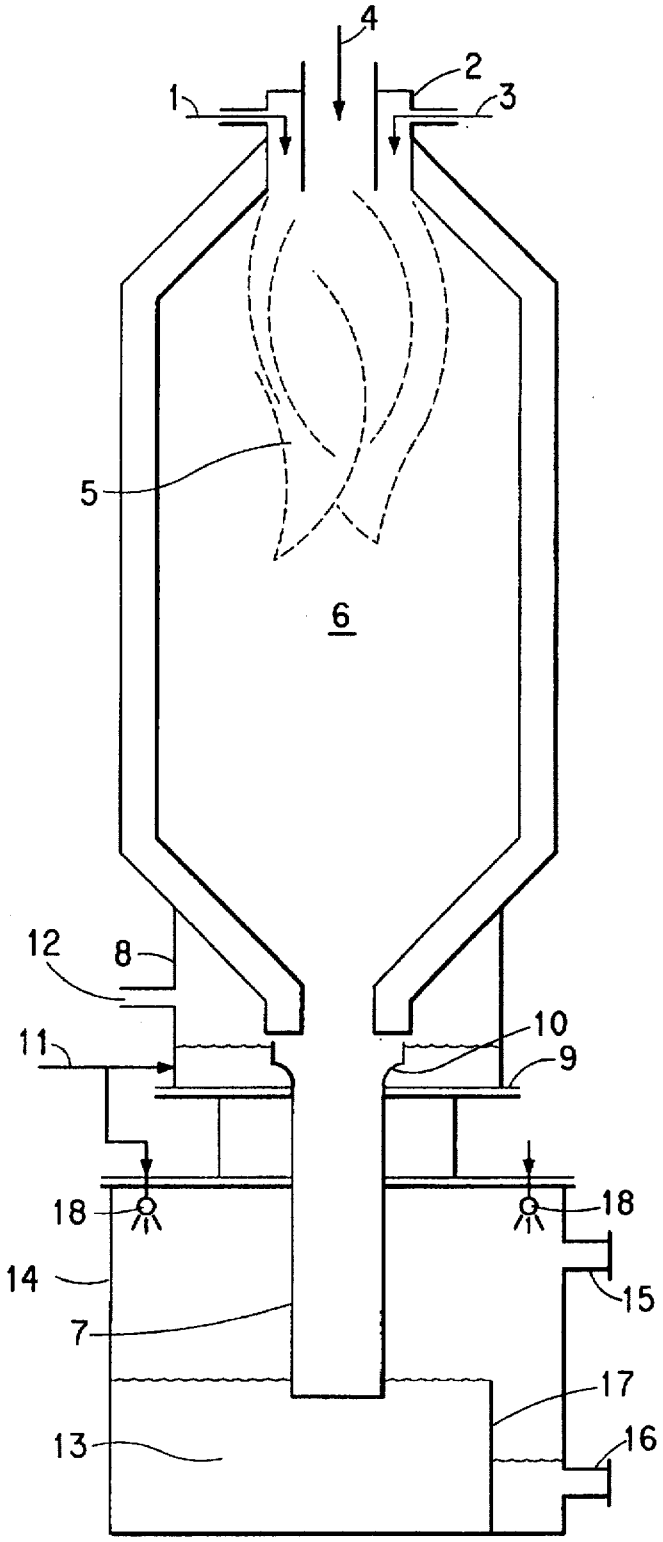
FIG. 1 illustrates in a schematic side elevation a typical combustion unit suitable for the operation of this invention.

In the FIGURE, feed line 1 is provided for natural gas or other fuel entering a burner assembly 2. Combustion air is fed to the burner assembly through line 3. The combination (mixture) of the fuel and combustion air provides the flame 5. Liquid or gaseous halocarbon waste(s) is fed into flame 5 through line 4 to be combusted in the flame. The burner assembly is positioned at the top end of the ceramic-lined combustion chamber 6, (thermal converter) which provides sufficient space and residence time for the complete oxidative combustion of the halocarbon waste to form a flue gas which is at a temperature of at least 1000° C. The combustion chamber transitions to a downflow cylinder 7, which is often simply called a downcomer. The transition from the chamber 6 to the downcomer 7 is contained within a housing 8. The bottom 9 of the housing has a central opening forming the inlet to the downcomer. The bottom 9 also has a dam 10 extending upwardly, but spaced from the bottom of the chamber 6. Air under pressure is fed into housing 8 through line 12 to provide sufficient pressure to prevent hot flue gas from flowing info the housing 8 instead of the downcomer. Water is fed to the housing 8 via line 11 to form a pool of water overflowing the dam to form a trim of water flowing down the interior surface of the downcomer. The downcomer dips into a pool of water 13 contained in a vessel 14 (quench tank), so the outlet of the downcomer is beneath the surface of the water contained in the vessel. The film of water flowing down the interior wall of the downcomer cools the hot flue gas passing from the combustion chamber, through the downcomer, and into the pool of water in the vessel. The hot flue gas starts the quenching and dissolving in the film of water and completes the quenching and dissolving in the pool of water, whereby the vessel collects/contains the resultant aqueous of haloacid. The quenched, but undissolved portion of the flue gas leaves vessel 14 by way of vent line 15, for further scrubbing units as necessary depending on remaining impurities. A portion of the aqueous solution of haloacid is withdrawn from the vessel via line 16 after overflowing weir 17 within the vessel, and this portion can be the recovered aqueous haloacid of the desired concentration. A portion this withdrawn aqueous halocid can also be recycled to the downcomer, i.e. as part of the feed through line 11, so that the film of water becomes a film of aqueous acid. This enables the concentration of acid dissolved in the aqueous medium to be increased. The withdrawn halocid can also be supplied to spray heads 18 to scrub the flue gas before it exits the vessel through vent line 15.

The process of combustion of liquid or gaseous halocarbon wastes using a gaseous or gasified fuel and an excess of air or oxygen is well known in the art. A temperature of at least 1000° C. is usually employed in the combustion zone, and the combustion chamber is ordinarily made of refractory bricks or tiles to withstand these temperatures and the hot corrosive gases resulting from the combustion. The refractory brick or tiles can be surrounded by a layer of insulating brick to reduce heat loss, and a metal outer wall for increased strength. The fuel, air and combustible or non-combustible halocarbons are usually introduced separately into the combustion zone, with any non-combustibles entering after the flame area. The usual products of combustion are primarily carbon dioxide and hydrogen halides. The hydrogen halides are typically removed by dissolving in water to make an aqueous acid as described above with reference to the FIGURE. The resulting aqueous acid is collected and either purified for further use or for sale or neutralized for disposal, depending on its concentration, composition and quality. The carbon dioxide and excess air are ordinarily vented to the atmosphere after a final scrubbing step to remove any remaining acidic impurities.

The process of the present invention is concerned with the quenching step described above in which the hot oxidative flue gases containing hydrogen halides are directly quenched in an aqueous liquid to make an aqueous acid solution, and in particular wherein the hydrogen halides contain fluorine, bromine and/or iodine and optionally chlorine, and wherein the concentration by weight of resulting aqueous acid is greater than about 10%.

The hot flue gases are quenched by direct contact with water, thereby both cooling the gases and simultaneously dissolving all or a major part of the hydrogen halide gases contained in the gases and reducing the amount which might otherwise have to be removed in a subsequent scrubbing or acid removal step. The quenching of the hot gases in the quench tank (vessel) is carried out in any suitable manner, such as for example by sparging the gases into a body of water by way of a submerged downcomer as shown in the FIGURE. Water sprays may also be used directed against the surface of the pool of water in the annular space within the vessel outside of the downcomer, or a combination of the sparging in the pool of water and water sprays may be used. The temperature of the aqueous quench medium will generally be from 30° to 90° C., and often from 35° to 50° C. so as to minimize the temperature contribution to the cause of corrosion.

The downcomer has an annular cross-sectional, preferably circular, and may be of smaller diameter than the combustion chamber to provide proper gas flow velocity and mixing turbulence, and connected to the combustion chamber by means of a transition piece such as indicated in the FIGURE. The outlet end of the downcomer is immersed in the aqueous liquid contained in a vessel so that the products of combustion of the downcomer tube pass through the liquid prior to entering the remainder of the vessel. Sufficient space is provided between the bottom end of the downcomer and the bottom of the vessel for the gases to leave the downcomer without excessive pressure drop.

The material of construction of the downcomer is a metal which is selected from the group consisting of rhenium, molybdenum and a molybdenum alloy with a molybdenum content of at least 50% by weight. The choice of which of these materials to use is primarily an economic balance between the cost of materials, fabrication costs, the estimated maintenance costs and the value of the acid produced at various strengths. With respect to molybdenum alloys containing at least 50% molybdenum by weight, molybdenum-rhenium or molybdenum-rhenium-tungsten alloys are particularly preferred as corrosion conditions intensify. For example, when the acid concentration in the aqueous quench medium increases above 30%, up to 50%, the preferred molybdenum alloy is molybdenum/rhenium, in which the rhenium content is from 5 to 50%, preferably 35 to 45%. When the acid concentration is greater than 50%, the preferred molybdenum alloy contains tungsten as well as rhenium, preferably 5 to 40% rhenium and 10 to 20% tungsten. The composition of the molybedenum alloy is chosen so that the alloy exhibits a corrosion rate not exceeding 0.254 mm/yr in the acid immersion test conducted in accordance with ASTM 631-72 (1990) for two days in the presence of air overlying the aqueous acid solution, wherein the temperature of the solution is from 40° to 90° C. and the acid concentration is from 18 to 61 wt % acid, with the acid being composed of about 80–86% HF and the remainder HCl. The molybdenum/rhenium alloy is chosen to preferably exhibit a corrosion rate not exceeding 0.254 mm/yr when the acid concentration is from 30 to 50 wt %, and the molybdenum/rhenium/tungsten alloy is chosen to preferably exhibit a corrosion rate not exceeding 0.254 mm/yr when the acid concentration is greater than 50 wt %, e.g. 50 to 65 wt %. These preferences exist for a temperature from 40° to 90° C., so that if the corrosion rate is undesirably high at a particular acid concentration, corrosion will be reduced by operating the aqueous quench at a lower temperature. Rhenium metal by itself can be used as the material of construction of the downcomer to withstand the most severe concentration of 50% and higher acid concentration in the aqueous quench medium.

U.S. Pat. No. 5,372,661 discloses and claims the composition of a novel molybdenum-rhenium-tungsten alloy having improved fabrication properties.

It is particularly surprising that rhenium, molybdenum and molybdenum alloys will withstand the corrosive acid exposure conditions described above in the presence of the oxidative atmosphere present from the oxidative combustion step creating the oxygen-containing flue gas, so as not to lose more than 0.254 mm/year in downflow cylinder wall thickness from the corrosion.

The cylindrical downcomer is preferentially fabricated by preparing two flat sheets or plates of molybdenum of about 3.18 mm to 4.76 mm thickness and required length and width, bending the molybdenum sheets or plates to form two identical semicircular pieces which when fitted together can form a cylinder of the required diameter and length, and fastening the two semicircular pieces together by riveting or electron beam welding two strips of molybdenum sheet of the same thickness as the semicircular pieces with molybdenum rivets so as to join both semicircular pieces along the length of the cylinder, one strip on each side. Riveting is preferred because of greater ease of fabrication and lower cost. This cylinder is joined to the bottom outlet of the thermal converter by a molybdenum flange fastened to the cylinder by a suitable transition piece if required.

The same construction technique can be used to fabricate or line the downflow cylinder from rhenium or molybedenum alloy. Most preferred materials of construction for lining the downflow cylinder or for constructing the entire cylinder are an alloy of 59% molybdenum/41% rhenium or 77% molybdenum/10% tungsten/13% rhenium.

The following example exemplifies a process for quenching the hydrogen halide-containing flue gases with water in a contacting device made of molybdenum or molybdenum alloys to produce hydrogen halide solutions of greater than 10% by weight concentration. It is understood that many variations may be made in this process by those skilled in the art without departing from the scope of the inventive process. All given percentages are by weight unless otherwise specified.

EXAMPLE

A fluorocarbon waste stream is composed primarily of chlorofluorocarbons, hydrochlorofluorocarbons, hydrofluorocarbons and perfluorocarbons with carbon chain lengths of 1 to 5 carbons. The overall composition has a chlorine content of 17.9%, a fluorine content of 59.0%, a carbon content of 22.3% and a hydrogen content of 0.8%. About 4.98 kg/hr of this waste is fed to a burner and atomized with 3.00 kg/hr of air. It is then mixed with 1.07 kg/hr of natural gas and 26.40 kg/hr of combustion air and burned at an average temperature of 1250° C. The temperature is controlled by the injection of 3.58 kg/hr of 16° C. cooling water. Residence time in the combustion zone is approximately 2 seconds. The burner exhaust gas has a composition of 1.3% HCl, 10.2% HF, 57.2% $N_2$, 18.2% $CO_2$, 10.0% $H_2O$, and 3.1% $O_2$. It is fed along with a 1.04 kg/hr air purge to a quench tank through a molybdenum downcomer of the previously described design. The quench tank contains an aqueous acid of about 15% HF and 3% HCl at a temperature of about 40° C. A portion of this acid, 159.10 kg/hr, is added to the molybdenum downcomer so as to flow down the entire inner surface of the downcomer. Another portion of this acid, 1990.8 kg/hr, is sprayed on the outside of the downcomer and into the vapor space of the quench tank., directed at the surface of the pool of aqueous acid in the quench tank. About 27.84 kg/hr of the aqueous acid in the quench tank is removed for sale or waste treatment. The composition of the exhaust gas leaving the quench tank is 66.3% $N_2$, 20.1% $CO_2$, 5.0% $H_2O$, 4.2% $O_2$, 3.9% HF and 0.5% HCl. It is at a temperature of about 45° C. It is then fed to scrubbers which remove remaining hydrogen halides before release to the atmosphere. The corrosion rate of the molybdenum downcomer under the above conditions is below 1 mil/yr (0.0254 mm/yr).

Higher strength acids may be obtained (e.g. 30% in the aqueous medium) by reducing the amount of water added and using molybdenum-rhenium or molybdenum-rhenium-tungsten alloys as described above in place of the molybdenum. The following table illustrates the relative suitability of molybdenum, molybdenum-rhenium and molybdenum-rhenium-tungsten alloys under more severe corrosion conditions, thereby permitting one skilled in the art to modify the above thermal destruction process so that quenching is carried out so as to generate a halogen acid of greater acid strength.

TABLE 1

Corrosion Tests on Various Metals

| Aqu. Acid | Temp. | | Corrosion Rates in Millimeters/Yr. | | | | | |
|---|---|---|---|---|---|---|---|---|
| % HF/% HCl | Deg. C. | Purge | Hast. B-2 | Mo | Re | Mo41Re | MoWRe | Note |
| 1%/0% | 40 | Air | .56, .61 | — | — | — | — | |
| 3%/0% | 40 | Air | 1.14, 1.63 | — | — | — | — | |
| 3%/0% | 40 | Air | 1.58, 1.96 | — | — | — | — | 1 |
| 15%/3% | 40 | Air | .53 | .02, .02 | — | — | — | 2 |
| 28%/7% | 65 | Air | 1.09, 1.42 | .03, .03 | — | .03 | — | 2 |
| 30%/7% | 90 | Air | 2.54, 3.81 | .15, .20 | — | .03, .03 | — | 2 |
| 53%/8% | 90 | Air | — | .81, .94 | 0.003 | .10, .13 | — | 2 |
| 53%/8% | 90 | $O_2$ | — | — | — | .08, .10 | .08 | 3 |
| 53%/8% | 90 | $O_2$ | — | — | .05 | .08, .09 | .06 | |

Notes:
General: Above tests were carried out in accordance with ASTM 631-72 (reapproved 1990). Hast. B-2 represents Hastelloy ® B-2. Mo represents an unalloyed molybdenum. Re represents unalloyed rhenium. Mo41Re represents a 59% molybdenum/41% rhenium alloy. MoWRe represents a 77% molybdenum/10% tungsten/13% rhenium alloy. All tests were carried out for 2 days except where noted. All test coupons were fully immersed in the acid except where noted. The corrosion rates are shown as duplicate results separated by a comma except for the single tests on Re and MoWRe.
Note 1: Coupon partially immersed. Corrosion results are for vapor.
Note 2: This was a 7 day test. The Hastelloy ® B-2 specimen was welded.
Note 3: These thinner MoRe coupons showed superficial pitting.

The above tests showed unsatisfactory overall results on Hastelloy® B-2. Molybdenum was satisfactory at 30% HF/7% HCl at 90° C. but less so at 53% HF/8% HCl. Mo41Re and MoWRe samples were generally satisfactory even at the most severe conditions tested, and are recommended for acid concentrations above 30% HF. Since the Mo41Re and MoWRe alloys are much more expensive than unalloyed molybdenum, molybdenum is preferred as a material of construction at acid concentrations of 30% HF or lower. An additional advantage of the molybdenum is that it has 20% higher design strength and 50% increased stiffness versus the Hastelloy® B-2, allowing the use of a thinner wall for the downcomer.

I claim:

1. An apparatus for converting gaseous hydrogen halides contained in hot flue gas to an aqueous solution of said hydrogen halides, comprising:

(a) downflow cylinder means having an upper inlet for receiving said flue gas and a lower outlet, (b) means for flowing an aqueous medium along the interior surface of said cylinder means, said interior surface of said downflow cylinder means comprising rhenium, molybdenum, or a metal of at least 50% by weight of molybdenum, and having a corrosion rate not exceeding 0.254 mm/year. and, (c) means for quenching and containing an aqueous medium positioned in communication with said outlet for receiving said flue gas after passage through said downflow cylinder means and thereby cooling said flue gas and forming said aqueous solution of the said hydrogen halide therein.

2. The apparatus of claim 1 and a means for withdrawing said aqueous solution of hydrogen halides from said containing means at a rate such that the concentration of said hydrogen halides in solution therein is at least 10% by weight.

3. The apparatus of claim 1 and a means for supplying a portion of said aqueous medium from said containing means to said flowing means.

4. A process comprising:

(a) oxidatively combusting a halocarbon in a combustion zone to form a flue gas having a temperature of at least 1000° C., the combustion of said halocarbon converting said halocarbon to gaseous hydrogen halides present in said flue gas, (b) passing said flue gas through a downflow cylinder communicating between said combustion zone and a pool of aqueous medium while cooling the interior surface of said cylinder with aqueous medium, said interior surface comprising rhenium, molybdenum, or a metal of at least 50% by weight molybdenum and having a corrosion rate not exceeding 0.254 mm/year, (c) collecting an aqueous solution of said gaseous hydrogen halide in said pool of aqueous medium.

5. The process of claim 4 and additionally, withdrawing aqueous medium from said pool at a rate at which the concentration of said hydrogen halides therein is at least 10% by weight.

6. The process of claim 5 wherein said hydrogen halides include hydrogen fluoride.

7. The process of claim 6 wherein said interior surface is molybdenum and said concentration of said hydrogen halides in said aqueous medium is up to 30% by weight.

8. The process of claim 6 wherein said interior surface is an alloy of molybdenum and rhenium and the concentration of said hydrogen halides in said aqueous medium is up to 50% by weight.

9. The process of claim 6 wherein said interior surface is rhenium or an alloy of molybdenum, rhenium and tungsten and the concentration of hydrogen halides in said aqueous medium is greater than 50% by weight.

10. The process of claim 6 wherein said interior surface is a metal selected from the group consisting of rhenium, molybdenum, alloy of molybdenum with 5% to 50% rhenium by weight, and alloy of molybdenum with rhenium and 10% to 20% tungsten by weight.

* * * * *